United States Patent Office 3,544,606
Patented Dec. 1, 1970

3,544,606
PROCESS FOR MAKING SARCOSINES
John J. Singer, Jr., Westboro, Mass., assignor, by mesne assignments, to W. R. Grace & Co., New York, N.Y., a corporation of Connecticut
No Drawing. Continuation of application Ser. No. 428,861, Jan. 28, 1965. This application Jan. 21, 1969, Ser. No. 802,714
Int. Cl. C07c *103/46, 103/66*
U.S. Cl. 260—404                                      6 Claims

ABSTRACT OF THE DISCLOSURE

Free fatty acids are reacted with a chlorinating agent to form the chloride of the fatty acid and an excess of 5 to 15%, by weight, of the chlorinating agent is left in the acid chloride to give a reagent useful for condensation with an amino acid, which reagent is thereafter condensed with a secondary amino acid to form an amide.

---

This application is a continuation of S.N. 428,861, filed Jan. 28, 1965, and now abandoned.

This invention is concerned with a process for the condensation of fatty acid chlorides with amino acids and more particularly concerned with the preparation of fatty acid sarcosine amides in high grades of purity suitable for use as pharmaceutical components.

Commonly, fatty acid sarcosinate amides are prepared by the method known as the Schotten-Baumann reaction or some minor modification of it. This reaction consists of a slow addition of a fatty acid chloride to a solution of sodium sarcosinate. An alkaline pH must be maintained. Inasmuch as hydrochloric acid is liberated during the condensation, there is a distinct tendency for the pH to drop unless it is consistently maintained at approximately pH 10 by the addition of sodium hydroxide or some other caustic solution. An alkalinity of approximately pH 10 is required to make the reaction function smoothly, and apparently the OH⁻ radicals act as a catalyst. The equation for this reaction can be written as follows:

Inasmuch as sarcosine condensates such as sodium n-lauroyl sarcosinate are normally in demand as a drug grade product, the presence of even small amounts of free fatty acid in the finished condensate is very undesirable. Once introduced into the mix, a fatty acid is virtually impossible to separate by any method applicable to quantity production techniques. It has, therefore, been necessary to use fatty acid chlorides of the highest purity, to store under conditions which rigidly exclude water or water vapor and to run the reaction in such a way as to minimize hydrolysis of the fatty acid in the reaction media before it has had an opportunity to react with the sarcosine.

It is accordingly, a basic object of this invention to provide a method for the preparation of sarcosine condensates, and for amino acid condensates generally of this type, keeping the fatty acid content substantially below that attainable by the conventional methods or, for all practical purposes, eliminating it.

It is another object of this invention to provide a method for conduction acid chloride reactions which avoids the necessity for special handling of the acid chloride so as to maintain substantially anhydrous conditions.

Other objects and advantages of the invention will in part be obvious and in part appear hereinafter.

My invention, accordingly, is based upon the discovery that the condensation of fatty acids with amino acids, preferably with secondary α-amino acetic acids, by the Schotten-Baumann procedure results in a purer product when the reaction mixture also contains a small amount of an inorganic chloride selected from the group consisting of phosphorus trichloride, phosphorus pentachloride, phosphorus oxychloride, sulfuryl chloride, and sulfuryl oxychloride. The reaction mixture preferably contains up to 15% by weight of the inorganic chloride. The minimum amount required is dependent upon the amount of moisture in the reaction system. During the condensation reaction, the inorganic chloride, e.g. phosphorus trichloride, is rapidly and completely hydrolyzed upon initiation of the reaction. Excessive amounts of the chlorinating agent are not harmful but because of the liberation of hydrochloric acid during this hydrolysis, it is necessary to use larger quantities of caustic to maintain the high pH requisite to the Schotten-Baumann condensation than would be the case of the inorganic chloride were not included in the reaction mixture.

The fatty acid condensates of secondary α-amino acetic acids are of greatest interest. These reactant secondary α-amino acetic acids have the general formula

Although R′ is not critical in the reaction, those compounds in which it is a lower alkyl or another acetic acid group are of greatest interest. The reactant of most immediate commercial interest is sarcosine,

The procedure of the present invention is generally applicable to the condensation of fatty acids with amino acids. The fatty acids of greatest interest are those having up to about 20–22 carbon atoms in the chain. These include the saturated as well as the unsaturated acids. The procedure is also applicable to preparing products from the commercially available mixtures of fatty acids such as tallow acid, coconut oil acid, etc.

Although fatty acid chlorides may be prepared by a number of techniques, the commercial methods commonly utilized involves reacting a fatty acid with an inorganic chlorinating agent such as phosphorus pentachloride, phosphorus oxychloride, sulfuryl chloride, sulfuryl oxychloride, and most commonly phosphorus trichloride. At the completion of the chlorination reaction, the reaction liquor separates into two layers. The bottom layer is hypophosphorus acid together with some unsaponifiable material which is of no further interest in the instant process. The uppermost layer contains the fatty acid chloride in which is dissolved most of the excess of the chlorinating agent. The fatty acid chloride phase is usually purified by one or more vacuum distillations at high temperatures. It is necessaray to maintain anhydrous conditions and glass vessels are usually used. The problems inherent in this procedure are illustrated by the preparation of lauric acid chloride (lauroyl chloride). Lauric acid is chlorinated with phosphorus trichloride to prepare lauroyl chloride. The excess phosphorus trichloride which boils at 76° at atmospheric pressure is distilled off. Vacuum distillation then separates the lauroyl chloride which boils at 145° C. under 18 ml. of mercury pressure. The high temperatures, particularly in the presence of traces of oxygen, cause the development of color and by-products which may be harmful. This is an especial difficulty when utilizing fatty acids containing double bonds such as oleic acid as the reactant fatty acid.

My invention also contemplates an economical process for preparing high purity fatty acid-amino acid condensates, in which a pure fatty acid reactant is chlorinated with an excess of an inorganic chlorinating agent, such as phosphorus trichloride, to produce the fatty acid chloride. The reaction mixture layer containing the fatty acid chloride and the excess inorganic chloride may be used directly in the Schotten-Baumann condensation without further purification. The result is a pure fatty acid-amino acid condensate low in free fatty acid which has been prepared without going through the elaborate, complicated and costly techniques usually utilized to purify the reactant fatty acid chloride.

Specific examples illustrating the preparation of condensation products in accordance with this invention will more clearly illustrate the techniques.

EXAMPLE I

Fatty acid chloride capable of producing a superior condensate product can be prepared by mixing 100 parts of n-lauric acid with 34 parts of phosphorus trichloride at a temperature of 50° C. The temperature is then raised to 70° C. and retained there for four hours. As the reaction which forms fatty acid chloride occurs, the reaction liquid will separate into two layers. The bottom layer is hypophosphorus acid, plus some unsaponifiable material which is almost always present even in the most pure forms of fatty acids. The uppermost layer contains lauroyl chloride in which is dissolved approximately eleven parts of phosphorus trichloride.

Lauroyl chloride together with unreacted phosphorus trichloride (approximately 5% by weight) derived from the uppermost layer of the reaction product of the preceding paragraph, is condensed with sarcosine in accordance with the Schotten-Baumann procedure. That is, sarcosine maintained in a solution of water at approximately 18% concentration is maintained within a temperature range of between 20°–30° C. while the lauroyl chloride-phosphorus trichloride mixture is added slowly with continuous agitation. Caustic is added as necessary to maintain the pH of the reaction mixture in the range from 10–10.5. Upon completion of the addition, which is a mole for mole reaction and may be assumed to proced on a quantitative basis, the reaction mixture is acidified and the oily layer of the sarcosine condensate separated and washed several times with hot water taking care the temperature of hot water is only a few degrees, for example, not more than 10° above the melting point of condensate. After neutralization of the oil with a suitable base in water the product is a water white solution of n-lauroyl sarcosine of pharmaceutical grade purity.

Care must also be taken to carry out the washing operation in the minimum amount of time since in its acidic form in the presence of water, the fatty acid amide sarcosinate will slowly hydrolyze into sarcosine and free fatty acid. In a commercial operation, care is taken to insure that the fatty acid sarcosinate amide is not left in contact with water above its melting point for more than 3–4 hours.

EXAMPLE II

The fatty acid-amino acid condensation procedure of Example 1 is carried out using a "pure" distilled n-lauroyl chloride together with 5% of phosphorus trichloride in the reaction mixture to produce a similar n-lauroyl sarcosinate of low free fatty acid content.

EXAMPLE III

Following the procedure of Example I, a mixture of stearoyl chloride and phosphorus trichloride is reacted with sarcosine to prepare stearoyl sarcosinate.

EXAMPLE IV

Following the procedure of Example I, a mixture of cocoyl chloride and phosphorus trichloride is reacted with sarcosine to prepare cocoyl sarcosinate.

EXAMPLE V

Following the procedure of Example I, a mixture of oleoyl chloride and phosphorus trichloride is reacted with sarcosine to prepare oleoyl sarcosinate.

The other inorganic chlorides specified hereinbefore, i.e., phosphorus pentachloride, phosphorus oxychloride, sulfuryl chloride and sulfuryl oxychloride, may be used in the process exemplified in place of phosphorus trichloride to obtain the advantages of the invention. Similarly, such other amino acids such as imino diacetic acid, taurine, proline, hydroxyproline, etc., may be used in my invention in place of the sarcosine reactant to obtain the corresponding fatty acid-amino acid condensates.

Fatty acid-amino acid condensates prepared under the normal careful processing techniques employed by the art will contain from about 2½% to 4% free fatty acid. Condensates made with equal care during the condensation and the washing operations and differing from the aforedescribed operation only in that the reaction mixture contains phosphorus trichloride or an equivalent chloride, will contain only about one-half as much free fatty acid as would the condensation carried out without the trichloride in the reaction mixture. The process of the present invention is particularly adapted to prepare the high purity products required in the pharmaceutical industry.

What is claimed is:
1. The process for producing high purity fatty acid-amino acid amide condensates comprising
   (i) at reaction temperature up to 80° C. reacting a fatty acid having 2 to 22 carbon atoms with and in the presence of an excess of the stoichiometric amount of chlorinating agent needed to form the corresponding fatty acid chloride, said chlorinating agent being selected from the group consisting of phosphorus trichloride, phosphorus pentachloride, phosphorus oxychloride, sulfuryl chloride, and sulfuryl oxychloride, thereby to produce a mixture of fully reacted fatty acid as fatty acid chloride containing dissolved in it a portion of the excess of said chlorinating agent remaining therewith to an amount up to about 15%, by weight, separating said fatty acid chloride and chlorinating agent from the second phase of the reaction mixture by simple decantation, and, thereafter,
   (ii) reacting said mixture of fatty acid chloride and excess chlorinating agent with an amino acid of low molecular weight corresponding to the formula $HN(R')CH_2COOH$, $R'$ being a lower alkyl or carboxyl group, under alkaline conditions to produce the fatty acid-amino acid condensate, and separating said condensate in a highly purified state.

2. The process of claim 1, wherein a fatty acid chloride containing 10 to 22 carbon atoms is condensed with a secondary α-amino acid, and wherein said chlorinating agent is phosphorus trichloride.

3. The process of claim 1, wherein said fatty acid contains 2 to 22 carbon atoms; said amino acid is a secondary α-amino acid; and said chlorinating agent is phosphorus trichloride.

4. The process of claim 3, wherein said amino acid is sarcosine.

5. The process of claim 4, wherein said chlorinating agent is present in an amount of about 5% of said reaction mixture for producing said fatty acid-amino acid condensate.

6. The process of claim 4, wherein said fatty acid is lauric acid.

References Cited

UNITED STATES PATENTS 2,126,180  8/1938  Dyson et al. _____ 260—123
2,689,170  9/1954  King _____ 167—93

OTHER REFERENCES

Morrison et al.—"Organic Chemistry," 1959, Allyn & Bacon, Boston, Mass., pp. 861–2.

ALEX MAZEL, Primary Examiner

R. V. RUSH, Assistant Examiner

U.S. Cl. X.R.

260—561